· US010444376B2

United States Patent
Kim et al.

(10) Patent No.: US 10,444,376 B2
(45) Date of Patent: Oct. 15, 2019

(54) MARINELLI BEAKER CORRECTION CONTAINER FOR STABLE RADIONUCLIDE ANALYSIS

(71) Applicant: KOREA HYDRO & NUCLEAR POWER CO., LTD., Gyeongju-si, Gyeongsangbuk-do (KR)

(72) Inventors: Hee Sun Kim, Uijeongbu-si (KR); Hoon Choi, Seoul (KR); Kwang Hee Yang, Seoul (KR); Hyunjin Joo, Seoul (KR)

(73) Assignee: Korea Hydro & Nuclear Power Co., Ltd., Gyeongju-si, Gyeongsangbuk-do (KR)

( * ) Notice: Subject to any disclaimer, the term of this patent is extended or adjusted under 35 U.S.C. 154(b) by 0 days.

(21) Appl. No.: 15/536,277

(22) PCT Filed: Aug. 4, 2015

(86) PCT No.: PCT/KR2015/008153
§ 371 (c)(1),
(2) Date: Jun. 15, 2017

(87) PCT Pub. No.: WO2016/098987
PCT Pub. Date: Jun. 23, 2016

(65) Prior Publication Data
US 2017/0343680 A1 Nov. 30, 2017

(30) Foreign Application Priority Data
Dec. 15, 2014 (KR) .................. 10-2014-0180466

(51) Int. Cl.
*G01T 7/02* (2006.01)
*G01T 1/167* (2006.01)
(Continued)

(52) U.S. Cl.
CPC ............... *G01T 1/167* (2013.01); *G01T 1/16* (2013.01); *G01T 7/00* (2013.01); *G01T 7/02* (2013.01)

(58) Field of Classification Search
CPC .... G01T 1/17; G01T 7/00; G01T 1/02; G01T 1/161; G01T 1/29
See application file for complete search history.

(56) References Cited

U.S. PATENT DOCUMENTS 4,932,561 A 6/1990 Boxall
6,415,937 B1 7/2002 DeJong et al.

FOREIGN PATENT DOCUMENTS

JP 02-282051 A 11/1990
JP 2013-205057 A 10/2013
(Continued)

OTHER PUBLICATIONS

Wang et al. "HPGe Detector Efficiency Calibration for Extended Cylinder and Mainelli-beaker Sources using the ESOLAN Program" Elsevier Science Ltd, Appl. Radiat. Isot. vol. 48, No. 1, pp. 83-95, 1997.*

(Continued)

*Primary Examiner* — David P Porta
*Assistant Examiner* — Mamadou Faye
(74) *Attorney, Agent, or Firm* — Rabin & Berdo, P.C.

(57) ABSTRACT

The present invention relates to a Marinelli beaker correction container for stable radionuclide analysis, the Marinelli beaker correction container including: a container body having a diameter corresponding to a detector mounting part provided at a lower part of the Marinelli beaker, and being insertedly mounted to the detector mounting part; a detector coupling groove being formed at a lower part of the container body with an inner diameter corresponding to a diameter of the spectroscopy system detector, and allowing (Continued)

the Marinelli beaker to be mounted on the spectroscopy system detector by insertedly mounting the spectroscopy system detector to the detector coupling groove; and a ventilation hole being vertically formed through a center of a top surface of the container body, and allowing the container body to be smoothly mounted or dismounted due to air ventilation when the container body is mounted to or dismounted from the detector mounting part.

4 Claims, 7 Drawing Sheets

(51) Int. Cl.
  *G01T 1/16* (2006.01)
  *G01T 7/00* (2006.01)

(56) References Cited

FOREIGN PATENT DOCUMENTS

| | | |
|---|---|---|
| JP | 2014-066557 A | 4/2014 |
| JP | 2014-085163 A | 5/2014 |
| KR | 20-1994-0012280 U | 6/1994 |
| KR | 20-0166575 Y1 | 2/2000 |
| KR | 20-0167931 Y1 | 2/2000 |
| KR | 10-0372755 B1 | 2/2003 |

OTHER PUBLICATIONS

Eckert et al. "Calibration Standards and Instruments Product Information" RD1, Ausgabe 1, Jun. 2, 2009 p. 1-132.*
Badawi et al. "An approach to evaluate the efficiency of γ-ray detectors to determine the radioactivity in environmental samples", Chinese Physic C vol. 38, No. 6 (2014), p. 066203-1-066203-7. (Year: 2014).*
European Search Report dated Jul. 13, 2018.
Doe et al., "HALS-300, 28$^{th}$ Edition", Feb. 1, 1997, XP55490589, USA, Retrieved from the Internet: URL:http://www.wipp.energy.gov/NAMP/EMLLegacy/ProcMan/sections/SECT7.PDF.
T.S. Part et al., "Measurement of radioactive samples in Marinelli beakers by gamma-ray spectrometry", Journal of Radioanalytical and Nuclear Chemistry, May 1, 1995, pp. 133-144, vol. 193, No. 1.

* cited by examiner

MARINELLI BEAKER CORRECTION CONTAINER FOR STABLE RADIONUCLIDE ANALYSIS

TECHNICAL FIELD

The present invention relates generally to a Marinelli beaker correction container for stable radionuclide analysis. More particularly, the present invention relates to a Marinelli beaker correction container for stable radionuclide analysis, which seals a gap generated due to a difference in diameter between a contact surface of a high purity germanium gamma spectroscopy system (HPGe) at the lower part of a new type of Marinelli beaker and a detector, to increase reliability of detected values when using various detectors even if the Marinelli beaker with a common diameter is used.

BACKGROUND ART

Generally, samples for radionuclide analysis have different shapes and different chemical and physical properties. The radioactivity may be small in a large sample, or the radioactivity may be large in a very small sample. If the sample is composed of a material with high density and high atomic number, it may be difficult to measure by gamma ray attenuation.

Accordingly, in order to obtain the best possible radioactivity spectra and reliable values, the sample should be mounted on the detector of the optimum condition.

Meanwhile, to analyze gamma ray-emitting nuclides present in the sample, it is important how gamma rays penetrate through materials and how the gamma rays are detected. To meet these requirements, high purity germanium gamma spectroscopy systems (hereinafter, referred to as "HPGe") have been widely used since such systems exhibit efficiency at low energy and excellent resolution over the entire energy range.

As the HPGe has been utilized domestically and internationally, Marinelli beakers (1 L) for filling samples therein to correspond to detectors mounted thereto have also been diversified.

Further, the recently introduced Marinelli beaker is large in size considering the diameter of the detector mounted to various HPGe products, whereby a gap between the detector and the detector-inserting portion of the lower portion of the beaker is formed, thereby causing an increase in uncertainty of the detected value. In other words, it is required to develop a correction container capable of reducing experimental error (geometric uncertainty) caused by the gap between the Marinelli beaker and the detector when the sample is mounted to the detector.

The experimental error can be expressed as the following standard uncertainty. In other words, combined standard uncertainty ($U_C$) refers to standard uncertainty of a measurement result when the measurement result is obtained from several different inputs, and if the uncertainty factor (input quantity) is independent, the combined standard uncertainty is obtained as in the following Equation 1, by combining uncertainty ($U_A$) obtained by statistically analyzing a series of observations and uncertainty ($U_B$) obtained by mathematical method.

In other words, the correction container is provided in a gap, which may occur in the contact surface between the lower part of the Marinelli beaker and the detector in the process of analyzing the sample, thereby reducing not only standard deviations occurring in repeated experiments, but also calibration errors during instrument calibration, which relates to statistically analytical uncertainty ($U_A$).

Equation 1

$$U_C = \sqrt{U^2_A + U^2_B} \quad \text{[Equation 1]}$$

In Equation 1, $U_C$ refers to the combined standard uncertainty, $U_A$ refers to uncertainty determined by observations, and $U_B$ refers to uncertainty determined by a mathematical method.

DOCUMENTS OF RELATED ART

Patent Document

1. Korean Utility Model Registration No. 20-0166575 (published Feb. 15, 2000)
2. Korean Patent No. 10-0372755 (published Feb. 17, 2003)

DISCLOSURE

Technical Problem

Accordingly, the present invention has been made keeping in mind the above problems occurring in the prior art, and an object of the present invention is to provide a Marinelli beaker correction container for stable radionuclide analysis, which seals a gap generated due to a difference in diameter between a contact surface of a high purity germanium gamma spectroscopy system (HPGe) at the lower part of a Marinelli beaker and a detector, thereby allowing the Marinelli beaker to be stably mounted on the detector.

Another object of the present invention is to provide a Marinelli beaker correction container for stable radionuclide analysis, which seals a gap generated due to a difference in diameter between a contact surface of a high purity germanium gamma spectroscopy system (HPGe) at the lower part of a Marinelli beaker and a detector, whereby the distance between the position of the radionuclide in the sample and the detector is stabilized, thereby improving reliability of the detected value.

A further object of the present invention is to provide a Marinelli beaker correction container for stable radionuclide analysis, which seals a gap generated due to a difference in diameter between a contact surface of a high purity germanium gamma spectroscopy system (HPGe) at the lower part of a Marinelli beaker and a detector, thereby reducing uncertainty in radionuclide analysis, and also facilitating mounting and dismounting of the Marinelli beaker.

Technical Solution

In order to accomplish the above object, the present invention is configured as follows. In other words, a Marinelli beaker correction container for stable radionuclide analysis according to the present invention, which allows a Marinelli beaker to be stably mounted on a spectroscopy system detector constituting a high purity germanium gamma spectroscopy system for analyzing gamma ray-emitting nuclides present in a sample, includes: a container body having a diameter corresponding to a detector mounting part provided at a lower part of the Marinelli beaker, and being insertedly mounted to the detector mounting part; a detector coupling groove being formed at a lower part of the container body with an inner diameter corresponding to a diameter of the spectroscopy system detector, and allowing the Marinelli beaker to be mounted on the spectroscopy system detector by insertedly mounting the spectroscopy system detector to the detector coupling groove; and a ventilation hole being vertically formed through a center of a top surface of the container body, and allowing the container body to be smoothly mounted or dismounted due to air ventilation when the container body is mounted to or dismounted from the detector mounting part.

According to the present invention, a vertical length of the container body may be longer than a vertical length of the detector mounting part provided at the lower part of the Marinelli beaker. More preferably, the vertical length of the container body is formed to be longer than the vertical length of the detector mounting part provided at the lower part of the Marinelli beaker by 1 cm or more.

Meanwhile, according to the present invention, the container body may be made of a polyethylene resin.

Advantageous Effects

The present invention is advantageous in that since a Marinelli beaker correction container is configured to seal a gap generated due to a difference in diameter between a contact surface of a high purity germanium gamma spectroscopy system (HPGe) at the lower part of a Marinelli beaker and a detector, the Marinelli beaker is allowed to be stably mounted on the detector.

The present invention is further advantageous in that since a Marinelli beaker correction container is configured to seal a gap generated due to a difference in diameter between a contact surface of a high purity germanium gamma spectroscopy system (HPGe) at the lower part of a Marinelli beaker and a detector, the distance between the position of the radionuclide in the sample and the detector is stabilized, thereby improving reliability of the detected value and reducing uncertainty in radionuclide analysis, and also facilitating mounting and dismounting of the Marinelli beaker.

BEST MODE

Hereinbelow, exemplary embodiments of a Marinelli beaker correction container for stable radionuclide analysis according to the present invention will be described in detail with reference to the accompanying drawings.

Figure 1A:
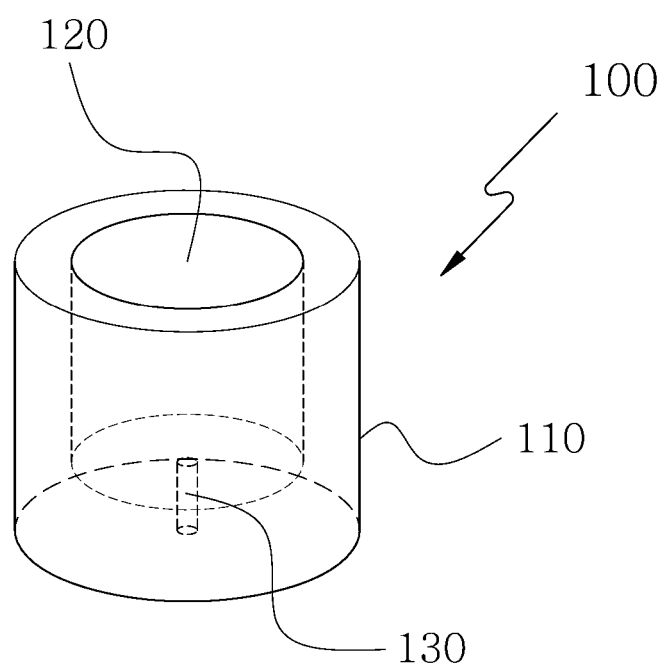
FIGS. 1a and 1b are perspective diagrams showing a Marinelli beaker correction container for stable radionuclide analysis according to the present invention.
Figure 1B:
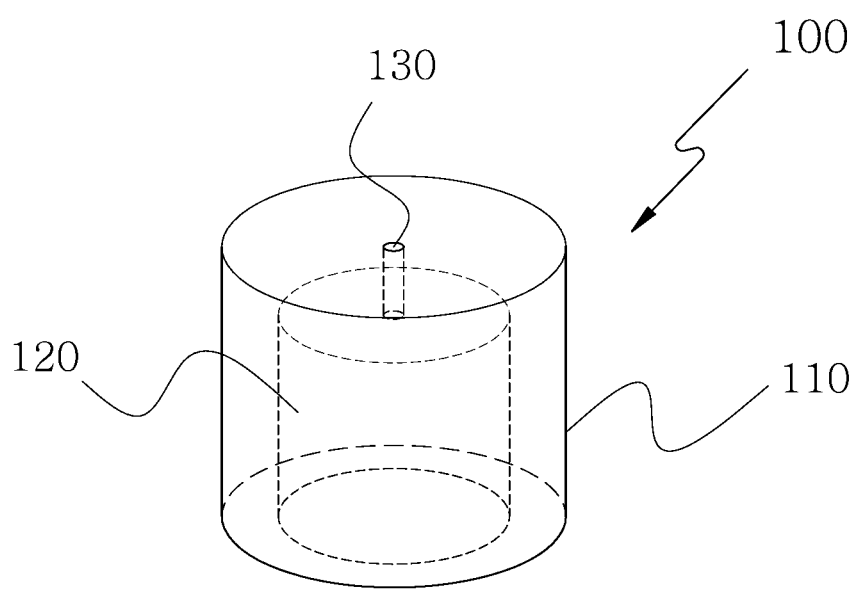
Figure 2A:
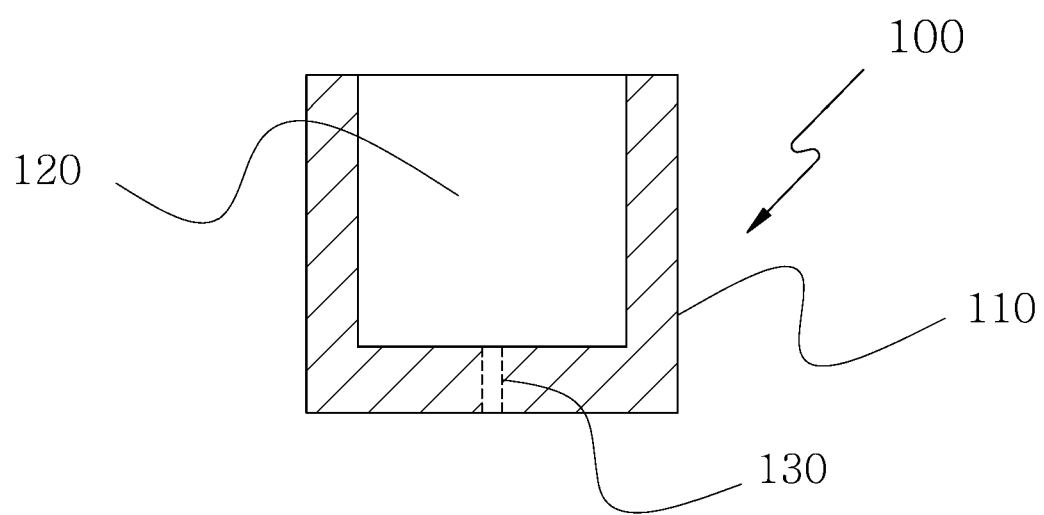
FIGS. 2a and 2b are longitudinal sectional diagrams showing the Marinelli beaker correction container for stable radionuclide analysis according to the present invention.
Figure 2B:
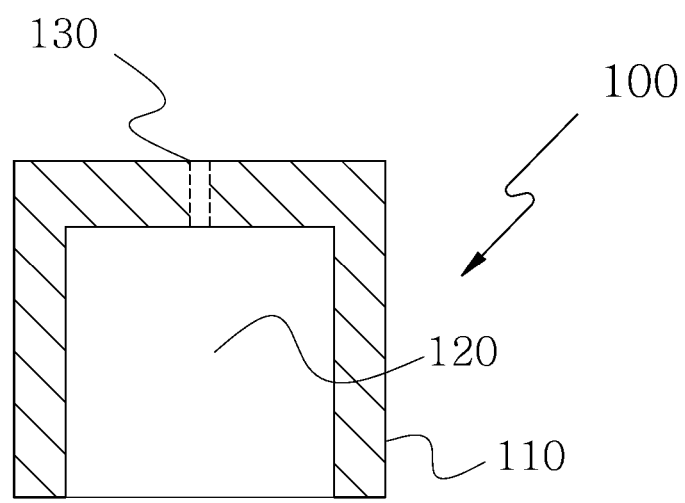
Figure 3:
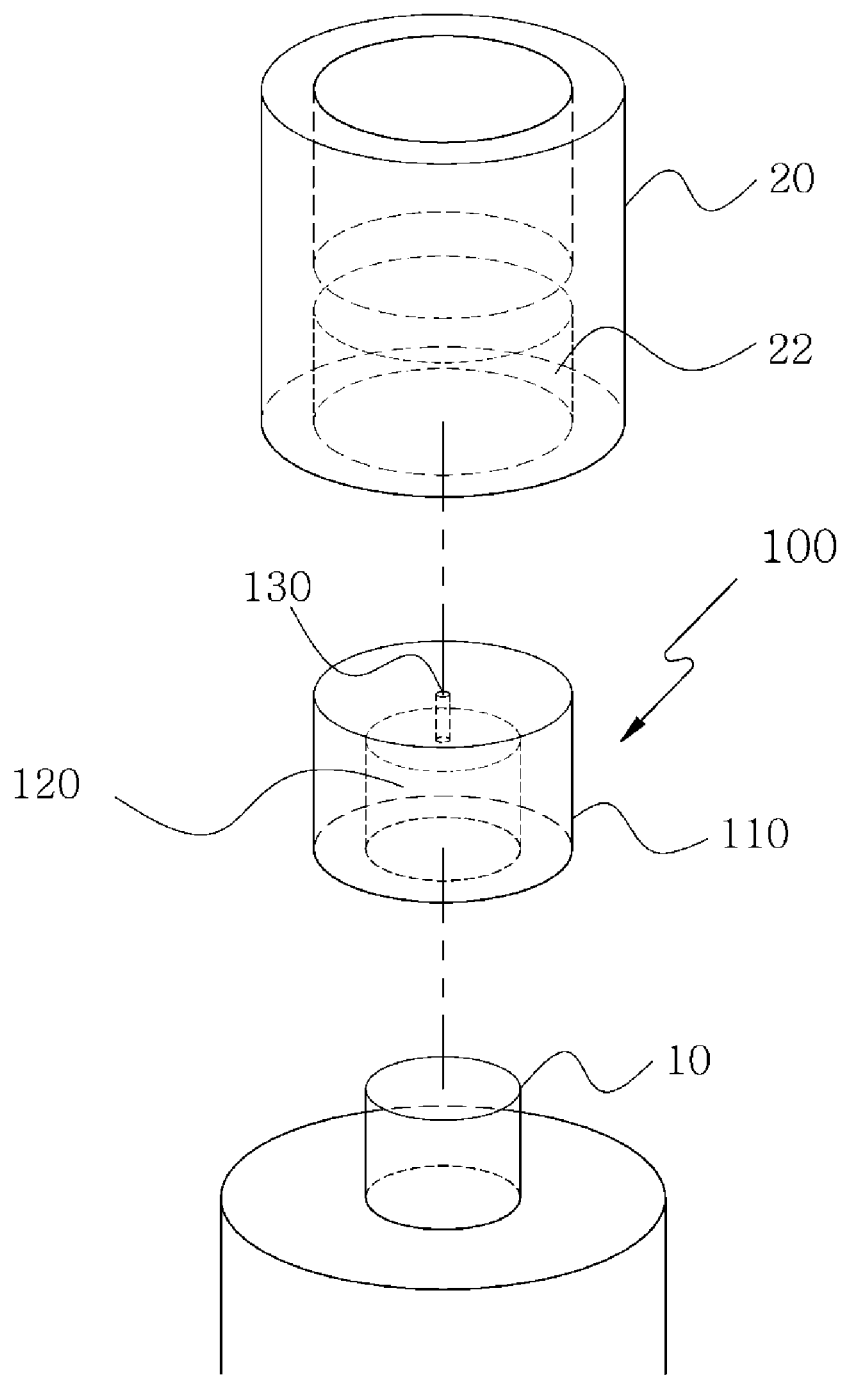
FIG. 3 is an exploded perspective diagram showing a process of mounting a Marinelli beaker through the Marinelli beaker correction container for stable radionuclide analysis according to the present invention.
Figure 4:
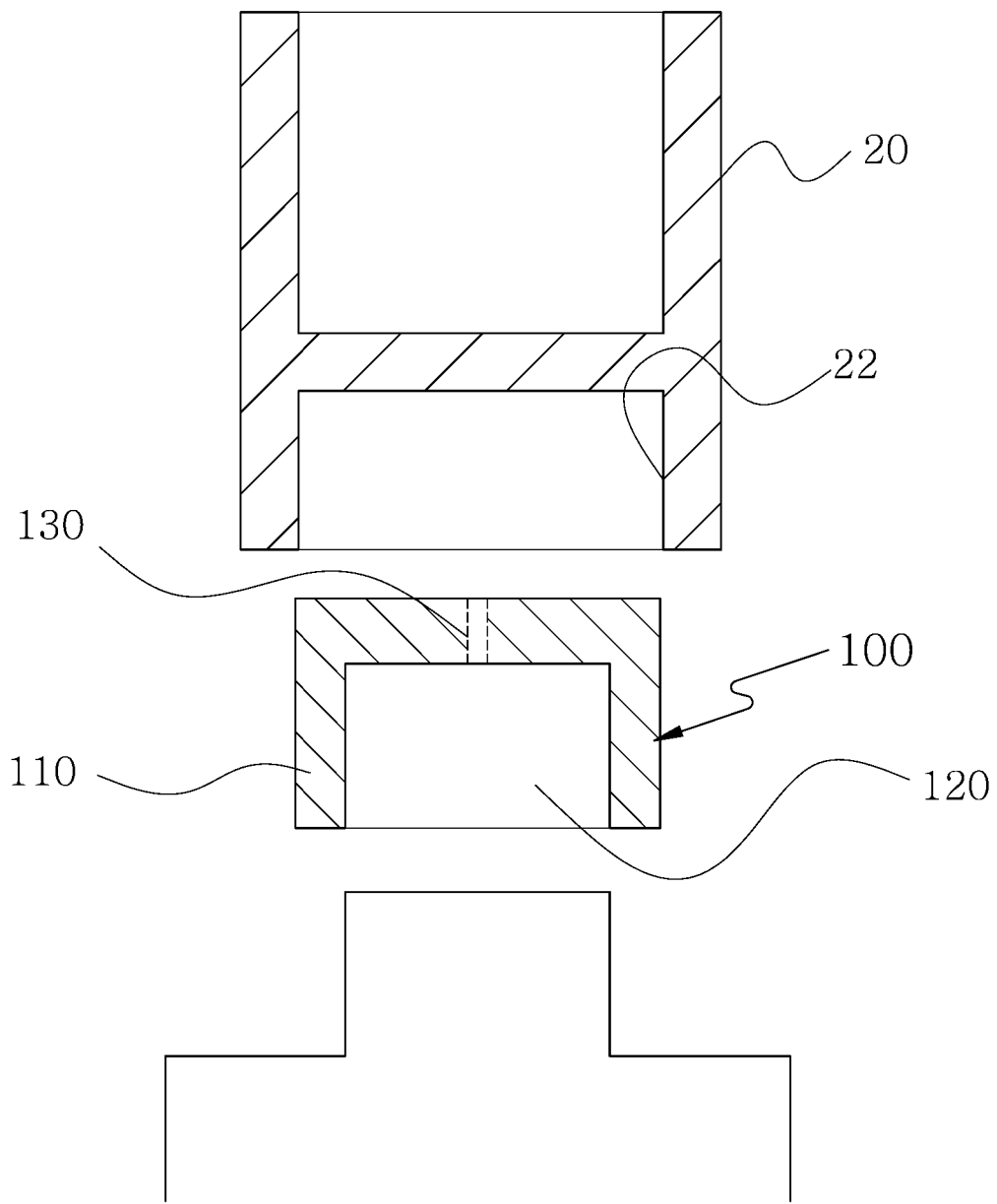
FIG. 4 is an exploded sectional diagram showing a process of mounting the Marinelli beaker through the Marinelli beaker correction container for stable radionuclide analysis according to the present invention.
Figure 5:
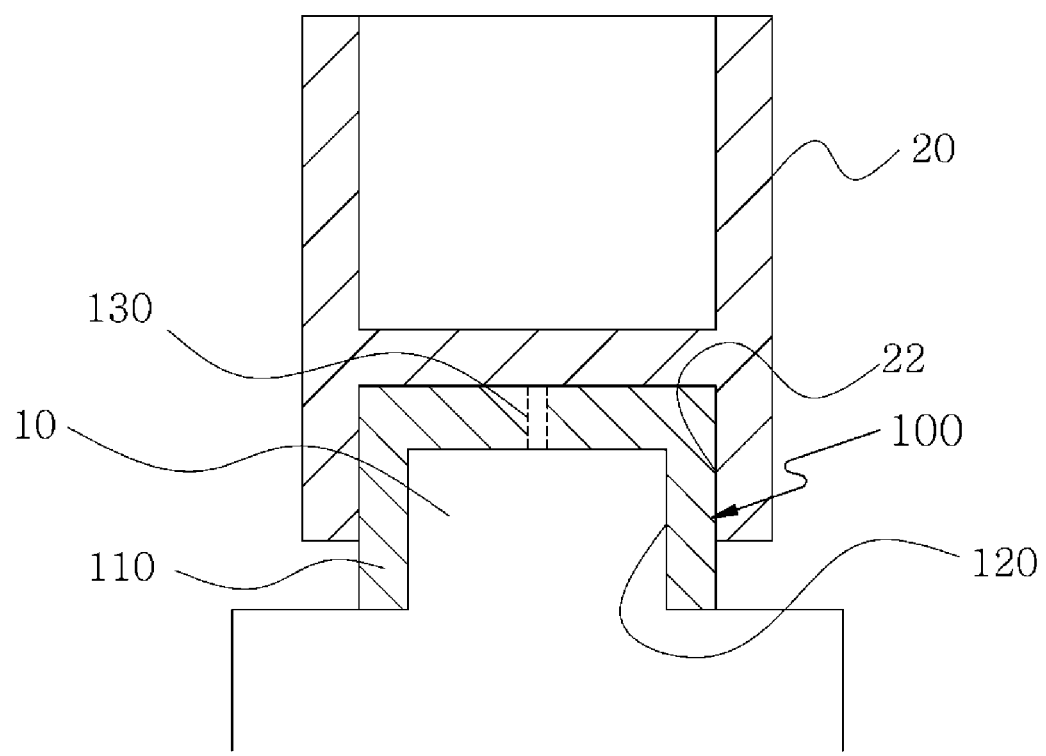
FIG. 5 is a longitudinal sectional diagram showing a state where the Marinelli beaker mounted through the Marinelli beaker correction container for stable radionuclide analysis according to the present invention.

FIGS. 1a and 1b are perspective diagrams showing a Marinelli beaker correction container for stable radionuclide analysis according to the present invention; FIGS. 2a and 2b are longitudinal sectional diagrams showing the Marinelli beaker correction container for stable radionuclide analysis according to the present invention; FIG. 3 is an exploded perspective diagram showing a process of mounting a Marinelli beaker through the Marinelli beaker correction container for stable radionuclide analysis according to the present invention; FIG. 4 is an exploded sectional diagram showing a process of mounting the Marinelli beaker through the Marinelli beaker correction container for stable radionuclide analysis according to the present invention; and FIG. 5 is a longitudinal sectional diagram showing a state where the Marinelli beaker mounted through the Marinelli beaker correction container for stable radionuclide analysis according to the present invention.

Before describing the technology according to the present invention, the technical principle of the present invention for solving the problems of the related art is summarized as follows. Firstly, Marinelli beakers are commonly used for the analysis of gamma ray-emitting nuclides in samples such as foods. The sample is filled in a donut shape into a conventional Marinelli beaker, mounted on a gamma ray detector in HPGe, and subjected to nuclide analysis.

However, the detector diameters installed in HPGe produced by various companies are not uniform, and a Marinelli beaker, which can be commonly used, has only recently been produced and distributed. A contact area of a detector mounting part provided at the lower part of the Marinelli beaker and a diameter of a spectroscopy system detector must match to reduce the detection uncertainty in analysis, but since the contact area of the detector mounting part provided at the lower part of the Marinelli beaker is larger than the diameter of the spectroscopy system detector, the Marinelli beaker filled with the sample is unstably mounted on the spectroscopy system detector.

As described above, if the Marinelli beaker filled with the sample is unstably mounted on spectroscopy system detector, the reliability of the detected value may be lowered because the distance between the position of the radionuclide in the sample and the detector is changed. In the present invention, a gap present in the detector mounting part at the lower part of a new type of Marinelli beaker recently introduced as a model of Coaxial HPGE Detector (GC 4019) in HPGe (7500SL) of CANBERRA Industries, which is most popular in Korea, is sealed, whereby it is possible to reduce uncertainty in radionuclide analysis.

The configuration according to the present invention and the overall operating principle will be described in detail as follows.

As shown in FIGS. 1 to 5, a Marinelli beaker correction container 100 for stable radionuclide analysis according to the present invention is formed in a cup shape, as shown in FIGS. 1a and 1b, and configured such that a bottom surface thereof is insertedly mounted to a detector mounting part 22 at a lower part of a Marinelli beaker 20, so as to allow a spectroscopy system detector 10 to be inserted in an open detector coupling groove 120 at a lower part of the Marinelli beaker correction container, thereby enabling the Marinelli beaker 20 to be mounted on the spectroscopy system detector 10.

To be more specific, as shown in FIGS. 1 to 5, the Marinelli beaker correction container 100 according to the present invention includes: a container body 110 with a diameter corresponding to the detector mounting part 22 provided at the lower part of the Marinelli beaker 20, and insertedly mounted to the detector mounting part 22; the detector coupling groove 120 being formed at a lower part of the container body 110, with an inner diameter corresponding to a diameter of the spectroscopy system detector 10, and allowing the Marinelli beaker 20 to be mounted on the spectroscopy system detector 10 by insertedly coupling the spectroscopy system detector 10 to the detector coupling groove; and a ventilation hole 130 being vertically formed through a center of a top surface of the container body 110, and allowing the container body 110 to be smoothly mounted or dismounted due to air ventilation when the container body 110 is mounted to or dismounted from the detector mounting part 22.

In other words, the Marinelli beaker correction container 100 according to the present invention is formed in a cup shape, as shown in FIGS. 1a and 1b, and is configured such that an open side of the detector coupling groove 120 faces downward. In other words, the Marinelli beaker correction container 100 is configured such that a bottom thereof faces upward, and the open side of the detector coupling groove 120 faces downward.

The Marinelli beaker correction container 100 according to the present invention configured as described above is formed in an inverted cup shape, wherein the bottom surface thereof is insertedly mounted to the detector mounting part 22 provided at the lower part of the Marinelli beaker 20, such that the spectroscopy system detector 10 constituting a high purity germanium gamma spectroscopy system is insertedly mounted to the detector coupling groove 120 of the Marinelli beaker correction container 100, thereby mounting the Marinelli beaker 20 on the spectroscopy system detector 10.

Meanwhile, the Marinelli beaker correction container 100 according to the present invention configured as described above is formed with the ventilation hole 130 vertically through a center of the bottom surface thereof. The ventilation hole 130 allows the Marinelli beaker correction container 100 to be smoothly mounted and dismounted due to air ventilation when the bottom of the Marinelli beaker correction container 100 is insertedly mounted to the detector mounting part 22 provided at the lower part of the Marinelli beaker 20 to mount the Marinelli beaker 20 on the spectroscopy system detector 10 or when the Marinelli beaker correction container 100 is dismounted from the detector mounting part 22 provided at the lower part of the Marinelli beaker 20.

In other words, as described above, when the bottom of the Marinelli beaker correction container 100 is insertedly mounted to the detector mounting part 22 provided at the lower part of the Marinelli beaker 20 to mount the Marinelli beaker 20 on the spectroscopy system detector 10, air pressure is generated between the bottom surface of the Marinelli beaker correction container 100 and the bottom surface of the detector mounting part 22 provided at the lower part of the Marinelli beaker 20, and the generated air pressure is exhausted through the ventilation hole 130 formed at the center of the bottom surface of the Marinelli beaker correction container 100, thereby facilitating insertion of the Marinelli beaker correction container 100 into the detector mounting part 22 provided at the lower part of the Marinelli beaker 20.

On the contrary, as described above, when the Marinelli beaker correction container 100 is dismounted from the detector mounting part 22 provided at the lower part of the Marinelli beaker 20, vacuum pressure is generated between the bottom surface of the Marinelli beaker correction container 100 and the bottom surface of the detector mounting part 22 provided at the lower part of the Marinelli beaker 20, and air enters through the ventilation hole 130, thereby facilitating dismounting the Marinelli beaker correction container 100.

The components of the Marinelli beaker correction container 100 according to the present invention will now be described in greater detail as follows. Firstly, the container body 110 constituting the present invention forms an external appearance, and as shown in FIGS. 1 to 5, the container body 110 is formed in a cylindrical shape with an upper part thereof closed and a lower part thereof open.

As described above, the cylindrical container body 110 is formed in a cup shape using a polyethylene resin, as shown in FIGS. 1a and 1b. Of course, as shown in FIGS. 1b and 2b, the use of the container body 110 formed in a cup shape is used with the bottom surface facing upward.

Meanwhile, as described above, the container body 110 formed in a cup shape is configured to have a diameter corresponding to the detector mounting part 22 formed at the lower part of the Marinelli beaker 20 to be insertedly mounted to the detector mounting part 22. Here, the container body 110 is made of a polyethylene resin.

Further, a vertical length of the container body 110 is formed to be longer than that of the detector mounting part 22 provided at the lower part of the Marinelli beaker 20. Here, more preferably, the vertical length of the container body 110 is formed to be longer than the vertical length of the detector mounting part 22 provided at the lower part of the Marinelli beaker 20 by 1 cm or more.

As described above, the vertical length of the container body 110 is formed to be longer than the vertical length of the detector mounting part 22 provided at the lower part of the Marinelli beaker 20 by 1 cm or more, whereby the Marinelli beaker correction container 100 is easily mounted to or dismounted from the detector mounting part 22 provided at the lower part of the Marinelli beaker 20.

Next, the detector coupling groove 120 constituting the present invention allows the Marinelli beaker 20 to be mounted on the spectroscopy system detector 10, and as shown in FIGS. 1 to 5, the detector coupling groove 120 is formed at the lower part of the container body 110, with the inner diameter corresponding to the diameter of the spectroscopy system detector 10, and allows the Marinelli beaker 20 to be mounted on the spectroscopy system detector 10 by insertedly coupling the spectroscopy system detector 10 to the detector coupling groove.

As shown in FIGS. 1b, 2b, 3, 4 and 5, the detector coupling groove 120 configured as described above is formed in a manner such that the lower part of the container body 110 is open, and the inner diameter of the detector coupling groove corresponds to the diameter of the spectroscopy system detector 10.

Accordingly, as described above, the detector coupling groove 120 is configured to have the inner diameter corresponding to the diameter of the spectroscopy system detector 10, whereby it is possible to stably mount the Marinelli beaker 20 on the spectroscopy system detector 10 by insertedly coupling the spectroscopy system detector 10 to the detector coupling groove.

In other words, since the grooved detector mounting part 22 formed at the lower part of the Marinelli beaker 20 generally has an inner diameter larger than the diameter of the spectroscopy system detector 10, if the Marinelli beaker 20 is directly mounted on the spectroscopy system detector 10, the Marinelli beaker 20 may be unstably mounted thereon due to difference in diameter between the detector mounting part 22 and the spectroscopy system detector 10.

As a result of the above described problem, the distance between the position of the radionuclide in the sample and the detector is not stabilized, and also reliability of the detected value is lowered. Accordingly, the lower part of the Marinelli beaker correction container 100, which is mounted to the detector mounting part 22 provided at the lower part of the Marinelli beaker 20, is configured such that the lower part of the container body 110 is formed with the detector coupling groove 120 having the inner diameter corresponding to the diameter of the spectroscopy system detector 10, to stably mount the Marinelli beaker 20 on the spectroscopy system detector 10.

Accordingly, the detector coupling groove 120 is mounted to the spectroscopy system detector 10, such that the Marinelli beaker 20 is stably mounted on the upper part of the spectroscopy system detector 10 through the Marinelli beaker correction container 100.

Next, the ventilation hole 130 constituting the present invention facilitates mounting or dismounting the container body 110 to and from the detector mounting part 22, wherein as shown in FIGS. 1 to 5, the ventilation hole 130 is vertically formed through the center of the top surface of the container body 110, thereby allowing the container body 110 to be smoothly mounted or dismounted due to air ventilation when the container body 110 is mounted to or dismounted from the detector mounting part 22.

As described hereinbefore, the ventilation hole 130 allows the air pressure to be exhausted therethrough when the bottom of the container body 110 is insertedly mounted to the detector mounting part 22 provided at the lower part of the Marinelli beaker 20 to mount the Marinelli beaker 20 on the spectroscopy system detector 10, or allows air to enter therethrough by the vacuum pressure when the container body 110 is dismounted from the detector mounting part 22 provided at the lower part of the Marinelli beaker 20, thereby facilitating mounting and dismounting the Marinelli beaker correction container 100.

To be more specific, when the bottom of the container body 110 is inserted into the detector mounting part 22 provided at the lower part of the Marinelli beaker to mount the Marinelli beaker 20 on the spectroscopy system detector 10, air pressure is generated due to compression between the bottom surface of the Marinelli beaker correction container 100 and the bottom surface of the detector mounting part 22 provided at the lower part of the Marinelli beaker 20, and the generated air pressure is exhausted through the ventilation hole 130, thereby facilitating insertion of the container body 110 into the detector mounting part 22 provided at the lower part of the Marinelli beaker 20.

Further, when the container body 110 is dismounted from the detector mounting part 22 provided at the lower part of the Marinelli beaker 20, vacuum pressure is generated between the bottom surface of the Marinelli beaker container body 110 and the bottom surface of the detector mounting part 22 provided at the lower part of the Marinelli beaker 20, and the vacuum pressure interferes with dismounting of the container body 110. Here, when air enters between the bottom surface of the Marinelli beaker container body 110 and the bottom surface of the detector mounting part 22 provided at the lower part of the Marinelli beaker 20 through the ventilation hole 130, the container body 110 can be easily dismounted from the detector mounting part.

As described above, the Marinelli beaker correction container 100 according to the present invention is insertedly mounted to the detector mounting part 22 provided at the lower part of the Marinelli beaker 20, thereby allowing the Marinelli beaker 20 to be stably mounted on the spectroscopy system detector 10 by insertedly coupling the spectroscopy system detector 10 to the Marinelli beaker correction container.

Further, as described above, the Marinelli beaker correction container 100 according to the present invention allows the Marinelli beaker 20 to be stably mounted on the spectroscopy system detector 10, whereby the distance between the position of the radionuclide in the sample and the detector is stabilized, thereby not only improving reliability of the detected value, but also reducing uncertainty in radionuclide analysis.

It is understood by those skilled in the art that the foregoing description is a preferred embodiment of the disclosed device and that various changes and modifications may be made in the invention without departing from the spirit and scope thereof.

DESCRIPTION OF REFERENCE CHARACTERS OF IMPORTANT PARTS 10. spectroscopy system detector
20. Marinelli beaker
22. detector mounting part
100. Marinelli beaker correction container
110. container body
120. detector coupling groove
130. ventilation hole

The invention claimed is:

1. A Marinelli beaker correction container for a Marinelli beaker to be stably mounted on a spectroscopy system detector, wherein the Marinelli beaker has a detector mounting part in a lower central portion thereof, the Marinelli beaker correction container comprising:
   a container body separated from the Marinelli beaker and the spectroscopy system detector and configured to be inserted into the detector mounting part, wherein an exterior shape of the container body corresponds to a shape of the detector mounting part and when the container body is mounted to the detector mounting part, the container body closely and directly contacts with an inner walls of the detector mounting part of the Marinelli beaker;
   a detector coupling groove formed of an open-bottom hollow at a lower central part of the container body, wherein an interior shape of the detector coupling groove corresponds to a shape of the spectroscopy system detector such that when the spectroscopy system detector is mounted to the detector coupling groove, the spectroscopy system detector closely contacts with an inner walls of the detector coupling groove; and
   an opening formed at a top side of the container body such that air passes through the opening in both directions thereof when the container body is mounted to or dismounted from the detector mounting part whereby the container body is allowed to be smoothly mounted or dismounted due to air ventilation.

2. The Marinelli beaker correction container of claim 1, wherein a height of the container body is greater than a depth of the detector mounting part of the Marinelli beaker.

3. The Marinelli beaker correction container of claim 1, wherein the container body is made of a polyethylene resin.

4. The Marinelli beaker correction container of claim 2, wherein the container body is made of a polyethylene resin.

* * * * *